United States Patent [19]
Hauser

[11] Patent Number: 5,699,992
[45] Date of Patent: Dec. 23, 1997

[54] PUMP STAND

[75] Inventor: Erwin Hauser, Emmendingen-Kollmarsreute, Germany

[73] Assignee: KNF Neuberger GmbH, Freiburg-Munzingen, Germany

[21] Appl. No.: 592,935

[22] Filed: Jan. 29, 1996

[51] Int. Cl.[6] .................................................. F16M 7/00
[52] U.S. Cl. .................. 248/635; 248/346.03; 248/638; 248/678; 248/680
[58] Field of Search ............................. 248/346.03, 500, 248/638, 678, 680, 681, 551, 346.01, 634, 635

[56] References Cited

U.S. PATENT DOCUMENTS

| | | | |
|---|---|---|---|
| 2,323,153 | 6/1943 | Pilson | 248/678 X |
| 2,662,988 | 12/1953 | McKim | 248/346.03 X |
| 2,867,405 | 1/1959 | Curriston | 248/678 X |
| 2,913,201 | 11/1959 | Blumkin | 248/678 |
| 3,850,392 | 11/1974 | Gassaway | 248/678 X |
| 4,805,868 | 2/1989 | Claude | 248/638 X |
| 5,303,896 | 4/1994 | Sterka | 248/638 X |
| 5,306,121 | 4/1994 | Heflin et al. | 248/638 X |
| 5,348,267 | 9/1994 | Lanting et al. | 248/638 X |
| 5,490,356 | 2/1996 | Kemeny | 248/638 X |

Primary Examiner—Ramon O. Ramirez
Assistant Examiner—Derek J. Berger
Attorney, Agent, or Firm—Panitch Schwarze Jacobs & Nadel, P.C.

[57] ABSTRACT

A pump stand (1) has a base plate (2) with a pump (3) mountable thereon. The pump (3) has supports (4) serving as its vibration damping elements with which it stands upon the base plate (2). Coupling elements (5) are provided on the pump underside and on the base plate upper side, for coupling the pump (3) and the base plate (2) with each other, whereby the coupling elements essentially engage in the assembled state of the pump without locking. The coupling elements (5) are located at a defined place suitable for pumps of different sizes.

15 Claims, 2 Drawing Sheets

PUMP STAND

FIELD OF THE INVENTION

The invention concerns a pump stand with at least one base plate as well as pumps which may be mounted thereupon with supports which serve as vibration dampers, especially for pumps of various sizes.

BACKGROUND OF THE INVENTION

Such base plates are used in order to keep pump vibrations away from an underlying support.

It is already known from U.S. Pat. No. 5,040,953 to connect a pump with the base plate through supports insulated against vibrations. The space holders used for this have in each case a projecting bolt on the upper side, which extends through a receiving hole in laterally overhanging flanges of the pump. Such a connection is provided at four places on the pump. Securing the positioned pump takes place with pegs which extend transversely through the bolts in question.

A relatively rapid mounting and dismounting of the pump is thereby possible. The space holders serving as vibration dampers remain on the base plate when the pump is removed.

The disadvantage here is that the pump by itself without the base plate cannot be repositioned insulated from vibration on account of the missing supports, and consequently cannot be used in practice as a pump standing by itself.

With pumps the supports or the anchoring places are, as a rule, placed in the extreme corner areas for reasons of weight distribution and protection against tipping, in order to attain optimal conditions in this regard. There consequently exists the problem that exchanging one pump for another size of pump is unfortunately not possible with pumps of various sizes, since the connection flange is not suitably arranged on the base plate in relation to the anchoring places which fit only one pump size.

SUMMARY OF THE INVENTION

The object of the present invention is to create a pump stand of the type mentioned at the beginning, which makes possible vibration-insulated installing and connecting of pumps of various sizes on and with one base plate. The possibility should also exist in the regard of operating the pump directly on a laboratory table, without disturbing vibrations being transmitted.

For solving this problem, it is proposed in accordance with the invention that the various pumps and the base plate have coupling elements separably connected with each other on their sides facing each other, that these coupling elements engage with each other without locking in the assembled state of the pump supported on its supports, and that the coupling elements be arranged at a defined place of the base plate and of the pump, suitable for various sizes of pumps.

The pump is consequently stably anchored on its supports on the base plate, and the coupling elements ensure that the unit including the pump stand can be moved trouble-free, whereby this can take place by the pump handle, and the base plate is thereby carried along by means of the coupling elements. Since the coupling elements in the assembled state have no holding or vibration damping function during operation, these can be arranged independently of the size of the pump at a defined distance from one another. A trouble-free exchange of the just-installed pump for one of another size is thereby possible.

The pump in question can be separated from the base plate by loosening the coupling elements, and can then be set up at another place on its supports.

It is especially advantageous if the coupling element(s) on the various pumps are arranged on their underside, and also if the coupling elements are arranged centrally or central symmetrically on the base plate.

Pumps of various sizes are thereby always arranged in the middle of the base plate.

The coupling elements are advantageously arranged within the area of the pump underside bounded by the supports and preferably also within the free space predetermined by the supports between the pump underside and the upper side of the base plate.

The interspace which is available in any case between pump and base plate is consequently used for the coupling elements, and no additional lateral space needs to be occupied.

It is provided according to one embodiment of the invention that coupling elements are provided on the pump underside as well as on the base plate upper side with through bores, and with these through bores arranged approximately in alignment in the assembled state of the pump, and that a fastening rod is provided for insertion and penetration of the coupling elements in the securing position.

The connection of the coupling elements with each other can consequently be undertaken in an easy manner by insertion of the fastening rod(s), likewise the disengagement.

It is advantageous if the base plate also has supports on the side facing away from the pump, which are constructed as vibration dampers. Since at the same time the pump also stands on the base plate with its supports serving as vibration dampers, a double vibration-insulated embodiment is obtained. Residual vibrations still transmitted from the pump to the base place can thereby be effectively kept away from an emplacement surface of the base plate. Consequently, use of the pump stand directly on a laboratory table is possible as well.

If necessary, connection junctions can also be provided for further base plates to be attached laterally. Consequently, a modular construction with several different aggregates next to each other is possible, whereby a functional unit can be constructed as a whole.

Additional configurations of the invention are presented in the further subclaims.

BRIEF DESCRIPTION OF THE DRAWINGS

The invention is discussed below in greater detail with its basic particularities on the basis of drawings below.

DETAILED DESCRIPTION OF PREFERRED EMBODIMENT

Figure 1:
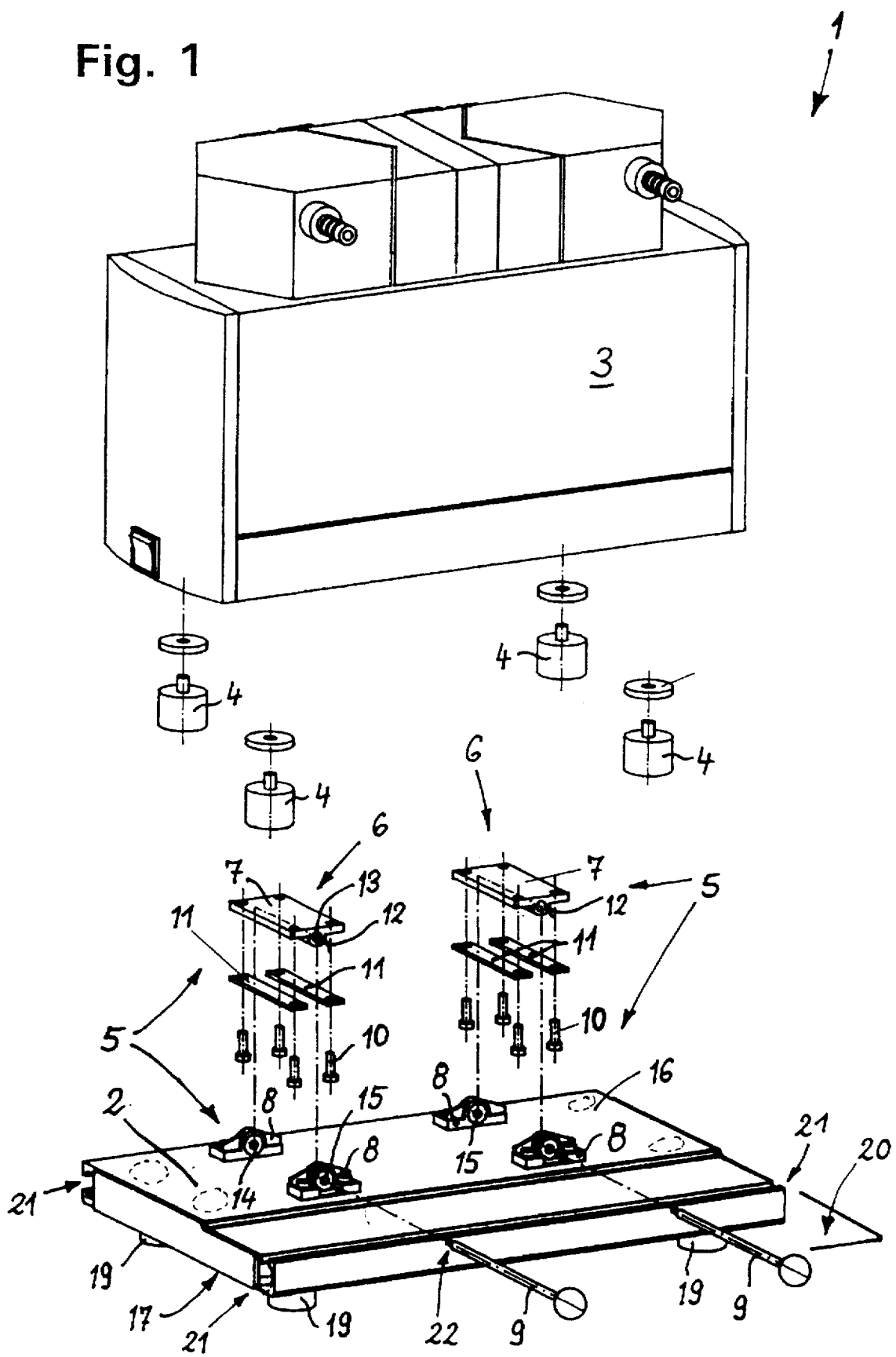
FIG. 1 is a perspective view of an exploded representation of the pump stand with base plate, pump and coupling elements.
Figure 2:
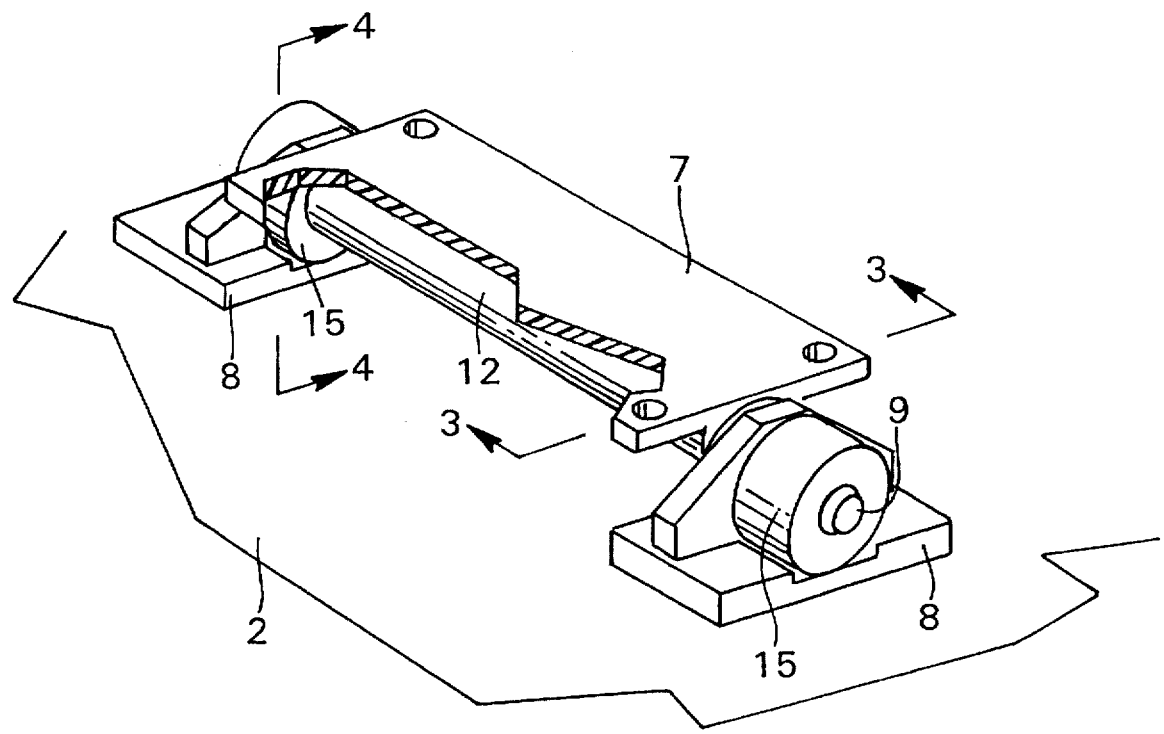
FIG. 2 is an enlarged perspective view, partially broken away, of the coupling elements shown in FIG. 1.

A pump stand 1 depicted in FIG. 1 has a base plate 2 as well as a pump 3 which can be mounted upon it. Anchored in the corner areas of its underside, the pump 3 has supports 4 which, for clarification in the embodiment illustrated, are shown removed from the pump in a preassembly condition.

The supports 4 are constructed as vibration dampers and can, for example, be made of rubber or plastic. The pump 3 is mounted on the base plate with these supports 4. The placement surfaces for the supports 4 on the base plate 2 are indicated by dashed lines.

In the assembled state, where the pump stands on the base plate 2 with its supports 4, the pump and the base plate can be connected to each other by means of coupling elements 5. The coupling elements are so constructed that they have no holding or support function in the assembled state of the pump 3. They first become functional when the entire pump stand 1 is to be repositioned, whereby this is lifted by the pump 3. The base plate 2 then remains on the underside of the pump 3 by means of the coupling elements 5 and is consequently transported to the new location. The coupling elements thereby indeed have a connecting function between base plate and pump, but are nonetheless independent of the supports 4.

With this the possibility exists of arranging the supports in the corner areas of the pumps, which are favorable for stability in every case, even in connection with pumps of various sizes, and of providing the coupling elements in a defined place in any given case independently of this, so that they are also suitably arranged at all times even for different sizes of pumps. The position of the coupling elements can, for example, be measured for the base surface of one of the smallest pumps to be set upon it, and this position is also retained for pumps of larger design. A trouble-free exchange of pumps of various sizes is thereby possible, whereby these are at all times optimally braced on the supports 4 according to their size, and on the other hand are connected lock-free with the base plate 2 in the assembled state. Lock-free means here that the coupling elements indeed engage each other securely, but have no holding or support function. This is attained by the presence of appropriate play between the engaging coupling elements.

In the embodiment shown the connection between the pump 3 and the base plate 2 takes place by means of two coupling element assemblies 6 set at a distance from each other, which in any given case essentially comprise a coupling plate 7, two bearing block-like counter elements 8, as well as a fastening rod 9 serving to secure the connection.

The coupling plates 7 are mounted on the underside of the pump 3 with the aid of screws 10 and with the interposition of supporting strips 11. The fastening position of these coupling plates 7 is determined by the predetermined position of the bearing block-like counter elements 8 which are attached on the base plate 2.

As shown in FIGS. 1–4 coupling plates 7 have a sleeve-shaped formation 12 which runs approximately longitudinally down the middle of the coupling plate. On both sides of the sleeve-shaped formation 12, the coupling plate forms a connecting flange in which holes for the screws 10 are provided. A longitudinal through bore 13 is present in the sleeve-shaped formation 12 which aligns with the holes provided in the counter elements 8 in the assembled state of the pump. The fastening rod 9 in the securing position then passes through the holes 14 of the counter elements 8 as well as the bore 13 of the sleeve-shaped formation of the coupling plate 7, whereby the fastening rod 9 in its fastening position can be detachably locked in the holes 14 of the counter elements 8. Through this constructively simple connection between the pump 3 and the base plate 2, the pumps allotted to the base plate 2 can be easily mounted or dismounted from the pump stand 1. Following their dismounting without extra handles the pumps 3 can thereby be immediately operated again by the user upon their supports 4, with damped vibrations and safe from tipping.

Figure 3:
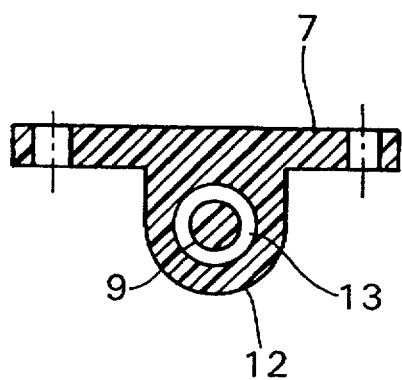
FIG. 3 is a cross-sectional view taken along lines 3—3 in FIG. 2.

As shown in FIG. 3, through bore 13 in the sleeve-shaped formation 12 has an essentially larger diameter in comparison with the fastening rod 9 so that there is sufficient play between them. For example, the through bore 13 can be greater than the diameter of the fastening rod 9 by a factor of 1.1 to about 1.5. An unintentional transmission of vibration from the pump 3 to the base plate 2 is thereby avoided. That the coupling plate 7 is made of soft elastic material, especially rubber, also contributes to this. Furthermore, bearing inserts 15 in connection with the bearing block-like counter elements 8, likewise of soft elastic material, especially rubber, are provided, which are installed in bearing bosses of the counter elements 8 which are preferably made of plastic. All these measures prevent, as already stated, an unintentional transmission of vibrations from the pump 3 to the base plate 2 through the coupling elements 5.

It should also be mentioned that in principle only a single coupling element assembly 6, for example in the middle of the base plate 2, could be provided, since even with a merely central connection, the pump 3 and the base plate would mutually brace each other by means of the supports 4 and could not tip over. It must only be assured hereby that the connection is sufficiently stable in order to carry the weight of the base plate 2. Also conceivable would be locking connections which engage when the pump 3 is set up and which would have to be subjected to sufficient stress that the locking connection would disengage for separation of the pump 3 from the base plate.

Figure 4:
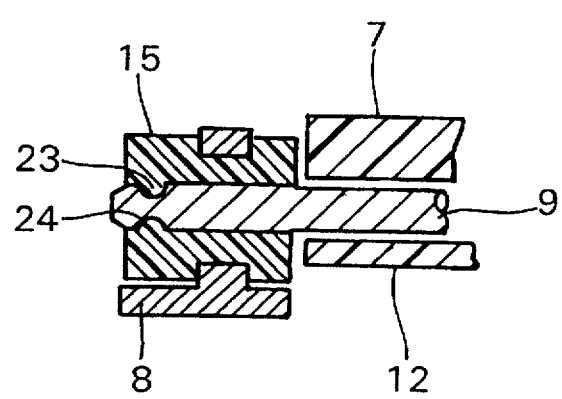
FIG. 4 is a cross-sectional view taken along lines 4—4 in FIG. 2.

As shown in FIG. 4, one of the bearing inserts 15 of the counter elements 8, especially the bearing insert 15 lying opposite the insertion side, is provided with a cross-sectional narrowing 23, and a detent groove 24 with a stop collar is provided at the insertion end 22 of the fastening rod 9, so that the fastening rod 9 in the final insertion position is held in place by the cross-sectional narrowing of the bearing insert.

The base plate 2 is here constructed as a one piece profile section with a plate upper side 16 and a plate underside 17, wherein the base plate 2 has vibration-damping supports 19 mounted below on the plate underside 17.

A doubly-insulated construction against vibration is achieved by the supports 4, 19 serving as vibration dampers so that any additional residual vibrations which are transferred from the pump 3 to the plate upper side 16 are kept away from the standing surface 20. The pump stand 1 can thereby also be set up on very vibration-sensitive standing surfaces, for example a laboratory table.

Connection junctions 21 are provided on the base plate 2 on the sides in their corner regions, in which for example rod-like connection parts can be inserted and can be connected through adjacently positioned base plates. In this way, several base plates 2 can be connected with each other in modular fashion.

We claim:

1. A pump stand comprising a base plate (2) and at least one pump (3) capable of being mounted upon the pump stand with supports (4) serving as vibration dampers, wherein the pump (3) has a first coupling element (7) located on the pump and the base plate (2) has a second coupling element (8) located on the base plate upper side, the first and second coupling elements (7,8) being separably attachable to each other on their sides facing each other, said first and second coupling elements (7,8) engaging with each other essentially without locking in an assembled state of the pump and the base plate, the first and second coupling elements (7,8) being arranged at a defined place on the base plate (2) and on the pump (3) such that the first and second coupling elements are adapted to be used in conjunction with pumps of various sizes, the first and second coupling elements (7, 8) including through bores which are arranged approximately in alignment in the assembled state of the pump and the base plate, and a fastening rod (9) being provided for insertion and penetration of the coupling elements (7,8) in a securing position, the first coupling element on the pump underside comprises at least one coupling plate (7) made of a soft elastic material with a sleeve-shaped formation (12) for the through bore (13), and the second coupling element on the base plate upper side comprises bearing block counter elements (8) with through bores (14) spaced at a distance from each other about the length of the coupling plate, and the through bore (13) has a larger diameter than that of the fastening rod (9).

2. The pump stand according to claim 1, wherein in the assembled state of the pump (3) play is present between the first and second coupling elements (5).

3. The pump stand according to claim 1, wherein the first coupling element on the underside of the pump and the second coupling element on the base plate (2) are arranged in a central location.

4. The pump stand according to claim 3 wherein the coupling elements are arranged within a surface area delimited by the supports (4) on the pump underside.

5. The pump stand according to claim 1, wherein the diameter of the bore is larger than that of the fastening rod by a factor of 1.1 to about 5.

6. The pump stand according to claim 1, wherein the bearing block counter elements (8) comprise plastic and have bearing bosses with bearing inserts (15) made of soft elastic material inserted therein.

7. The pump stand according to claim 6, wherein a locking connection engaging an insertion end position is provided for the fastening rod (9).

8. The pump stand according to claim 7, wherein for the locking connection of the fastening rod one of the bearing inserts (15) has a cross-sectional narrowing, the fastening rod has a locking groove engaging in the insertion end position, and a handle is provided on one end of the fastening rod.

9. The pump stand according to claim 1 wherein the at least one coupling plate (7) has side flanges with holes for fastening elements.

10. The pump stand according to claim 1, wherein supporting strips (11) are provided for fastening the coupling plate (7) to the pump, the supporting strips being located approximately parallel to and alongside the sleeve-shaped formation.

11. The pump stand according claim 1, wherein two assemblies are provided as coupling elements spaced at a distance from each other longitudinally along the base plate (2), each assembly comprising two bearing block counter elements (8), a coupling plate (7), and a fastening rod (9).

12. The pump stand according to claim 1, wherein vibration-damping supports (19) are provided on an underside (17) of the base plate. (2).

13. The pump stand according to claim 1, wherein connection junctions (21) are provided on the base plate for further base plates (2) to be connected laterally thereto.

14. The pump stand according to claim 13, wherein the base plate (2) has connection junctions for rod-shaped connection parts on at least two sides lying opposite each other.

15. A pump stand comprising a base plate (2) and at least one pump (3) capable of being mounted upon the base plate with supports (4) serving as vibration dampers, wherein the pump (3) has a first coupling element (7) located on the pump underside and the base plate (2) has a second coupling element (8) located on the base plate upper side, the first and second coupling elements (7,8) being separably attachable to each other on their sides facing each other, said first and second coupling elements engaging with each other essentially without locking in an assembled state of the pump and the base plate, the first and second coupling elements (7,8) being arranged at a defined place on the base plate (2) and on the pump (3) such that the first and second coupling elements are adapted to be used in conjunction with pumps of various sizes, the first and second coupling elements (7, 8) including through bores arranged approximately in alignment in the assembled state of the pump and the base plate, and a fastening rod (9) being provided for insertion and penetration of the first and second coupling elements in a securing position, the first coupling element on the pump underside comprises at least one coupling plate (7) with a sleeve-shaped formation (12) for the through bore (13), and the second coupling element (8) on the base plate upper side comprises bearing block counter elements (8) with through bores (14) spaced at a distance from each other about the length of the coupling plate, the bearing block counter elements (8) comprise plastic and have bearing bosses with bearing inserts (15) made of soft elastic material inserted therein, and a locking connection for retaining an insertion end of the fastening rod (9), the locking connection of the fastening rod including a cross-sectional narrowing in at least one of the bearing inserts (15), and a locking groove located on the fastening rod for engagement in the cross-sectional narrowing, and a handle located on one end of the fastening rod.

* * * * *